Feb. 13, 1968  C. B. RUBINSTEIN ET AL  3,368,861
FARADAY ROTATOR UTILIZING TERBIUM ALUMINUM GARNET
AND DYSPROSIUM ALUMINUM GARNET
Filed May 4, 1964                                    2 Sheets-Sheet 1
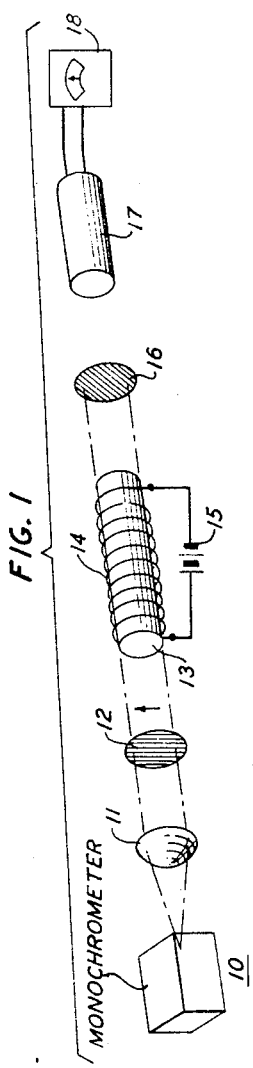
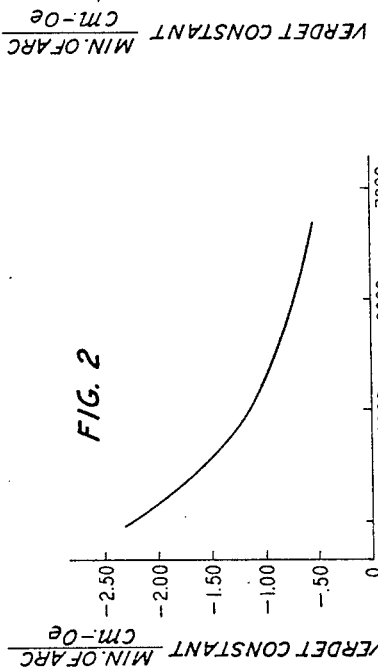
INVENTORS C. B. RUBINSTEIN
L. G. VAN UITERT
BY
*[signature]*
ATTORNEY

3,368,861
FARADAY ROTATOR UTILIZING TERBIUM ALUMINUM GARNET AND DYSPROSIUM ALUMINUM GARNET

Charles B. Rubinstein, Summit, and Le Grand G. Van Uitert, Morris Township, Morris County, N.J., assignors to Bell Telephone Laboratories, Incorporated, New York, N.Y., a corporation of New York
Filed May 4, 1964, Ser. No. 364,535
4 Claims. (Cl. 350—151)

This invention relates to optical devices utilizing the Faraday rotation effect. More specifically it concerns rotating materials which provide useful and unexpected optical properties.

Attending the recent interest in the generation of coherent light radiation by optical or light-frequency masers, commonly termed lasers, is an intense interest in various optical devices which are necessary for the practical utilization of this new form of radiation. These devices are analogous in function to corresponding RF or microwave elements of the prior art.

A principal effect according to which many of these optical devices operate is the Faraday rotation effect. This is based upon the principle that when electromagnetic radiation is passed through a longitudinally magnetized body of an appropriate material, any given plane of polarization is rotated as a linear function of transmission distance. The degree of rotation is also related to the magnetic field imposed on the material. Rotation devices based upon this principle are known in the art; and an effective rotating medium and an exemplary rotational device are described and claimed in United States Patent No. 2,974,568, issued Mar. 14, 1961. This discussion and this invention are directed to light frequency devices including those operating at infra-red and ultra-violet wavelengths. The optical or light spectrum is generally considered to extend from 100 to $10^6$ Angstroms.

While the prior art devices are effective, the search is continuing for new and better rotating materials. Many considerations are important in selecting the rotating medium. Among these are the Verdet constant which defines the length of the transmission path for a given magnetic field required to achieve the desired function, the ease and expense of obtaining the rotating material, the chemical and physical stability of the material and its optical absorption in the band of interest. To a large extent the latter factor defines the loss characteristics of a rotating device incorporating that material.

This invention is directed to a class of rotating materials which, according to the foregoing considerations, among others, provide extremely useful and unexpected light rotating characteristics.

The light rotating materials according to the invention are terbium aluminum garnet and dysprosium aluminum garnet. These compounds are paramagnetic and under the influence of an appropriate magnetic field are extremely effective light rotators.

The rotation of these garnet materials will be considered here in terms of the Verdet constant which is related to the parameters of interest by:

$$\theta = VlH$$

where $\theta$ is the angle of rotation in minutes of arc, $V$ is the Verdet constant, $l$ is the length of transmission in cm. and $H$ is the magnetic field in oersteds. This proportional relationship is valid except at extremely low temperatures where saturation effects are encountered whereupon the rotation becomes proportional to a Brillouin function, which under certain conditions reduces to $$\theta = A \tan h \frac{\mu H}{KT}$$

where $\mu$ is the magnetic moment, $K$ is Boltzmann's constant, $T$ is the temperature in degrees Kelvin and $A$ is the saturation rotation at the frequency of interest. The Verdet constant $V$ in the visible (neglecting infra-$f$ orbital transitions) for the trivalent ions under discussion is obtained from:

$$V \sim v_i^2 \Sigma_{n'} \left[ \frac{A_1(n')}{(v_{n'}^2 - v_i^2)^2} + \frac{A_2(n')}{T(v_{n'}^2 - v_i^2)} + \frac{A_3(n')}{(v_n^2 - v_i^2)} \right]$$

where $v_i$ = frequency of incident light,
$v_{n'}$ = absorption frequency of glass sample, and
$A_1$, $A_2$, and $A_3$ are constants for the material and are related to the various absorptions.

For a further explanation of these and other aspects of the Verdet constant and its significance see Theory of Electric and Magnetic Susceptibilities by J. H. Van Vleck, Oxford University Press (1932).

It is evident from these equations that the rotating ability of these materials is substantially improved as the temperature of operation is reduced.

The particular optical properties of the materials used in the devices of this invention and a brief consideration of the devices themselves will perhaps be more readily appreciated when considered in conjunction with the drawing in which:

FIG. 1 is a schematic representation of an apparatus used to measure the light rotating properties of rotating elements constructed according to this invention;

FIG. 2 is a plot of the Verdet constant versus wavelength for terbium aluminum garnet, $Tb_3Al_5O_{12}$;

FIG. 3 is a similar plot for dysprosium aluminum garnet, $Dy_3Al_5O_{12}$;

Figure 4:
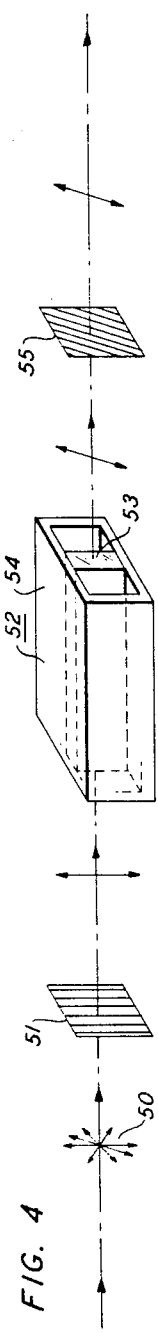
FIG. 4 is a schematic representation of the operation of an optical modulator according to the invention.

Various garnet samples were prepared according to the following general procedure:

Reagent grade oxides and fluorides were combined in the following proportions.

For terbium aluminum garnet:

| Crystal components— | Grams |
|---|---|
| $Tb_2O_3$ | 27.5 |
| $Al_2O_3$ | 22.9 |

| Flux components— | |
|---|---|
| PbO | 129 |
| $PbF_2$ | 158 |
| $B_2O_3$ | 7 |

For dysprosium:

| Crystal components— | |
|---|---|
| $Dy_2O_3$ | 28.0 |
| $Al_2O_3$ | 22.9 |

| Flux components— | |
|---|---|
| PbO | 129 |
| $PbF_2$ | 158 |
| $B_2O_3$ | 7 |

The mixtures were placed in 100 ml. platinum crucibles, fitted with tightly crimped lids to minimize loss by evaporation and placed directly into a furnace at a temperature of 1300° C. The furnace was equipped with silicon carbide resistance heaters and muffle. Zirconium oxide setter baths formed the seat between crucibles and muffle to prevent reaction between the platinum and silicon carbide. The temperature of the furnace was maintained at 1300° C. for approximately one hour to allow the furnace to come to equilibrium. The furnace was then cooled slowly at a rate of 1° C. per hour until a temperature of 950° C. was reached, at which point the furnace was shut down, the furnace door was opened and the crucibles were allowed to cool to room temperature. The solidified flux was dissolved by heating the entire crucible in dilute nitric acid leaving the garnet crystals.

The garnet samples prepared in the foregoing manner were optically transparent. Typical absorption losses for these materials are 0.03 to 0.08 db/cm. at 6350 Angstroms, which is unusually low.

The light rotating properties of terbium and dysprosium aluminum garnets were measured in terms of their Verdet constants. The data was obtained with the aid of the apparatus shown in FIG. 1. In FIG. 1 element 10 represents a monochromator which is of known construction and serves to generate a point source of monochromatic light. The bandwith of the monochromator was less than 60 Angstroms. The output radiation from the monochromator was beamed through a collimator lens 11 to obtain an essentially parallel beam and was then transmitted through a first prism 12 known to the art as a Glan-Thompson prism which polarizes the light into the plane indicated by the arrow. The radiation then enters the rotating element 13 which is a rod of terbium or dysprosium aluminum garnet. The rotator 13 is maintained in a magnetic field generated by coil 14 and power source indicated at 15 and which, for these investigations, has a field value of 7250 oersteds in the direction of propagation of the radiation. The radiation emanating from the sample is then analyzed by another Glan-Thompson prism 16 to detect the amount of rotation attributable to the given length of glass rod and the incident field. The detection was made by a multiplier phototube 17 and differential voltmeter 18. The readings were made by rotating the prism 16 to give minimum intensity and measuring the angle of rotation of the prism.

The Verdet constants at room temperature for the garnets of interest are plotted as a function of wavelength in FIGS. 2 and 3. FIG. 2 is directed to terbium aluminum garnet and FIG. 3 to dysprosium aluminum garnet. The rotation is found to increase for higher frequencies suggesting even more effective devices for smaller wavelength systems such as systems operating in the green band currently being sought for transmission through water. Effective rotation at other frequencies permits the application of the invention to systems operating over a broad region of the light spectrum, including infra-red and ultra-violet radiation.

Those skilled in the art will appreciate that the Verdet constants shown in FIGS. 2 and 3 are unexpectedly high. This suggests that these materials are exceptionally well suited for use as rotation elements in optical devices which depend for their operation on the Faraday rotation effect.

Various of these devices are presently known in the art. As previously indicated these include isolators, modulators, gyrators, circulators, etc.

FIG. 4 shows a typical modulator construction adapted to utilize a rotating element comprising one or more of the foregoing garnet materials. The input radiation is shown symbolically as an unpolarized beam 50 which is polarized by prism 51 which may be a Glan-Thompson or Nicol prism or similar polarizing medium. The plane polarized beam is then transmitted through the rotating element 52. This element comprises a garnet rod 53 having a composition according to this invention mounted in a rectangular waveguide 54. The waveguide is of known construction. An electromagnetic signal introduced into the waveguide possesses magnetic fields which couple with the magnetic rare earth ions in the glass producing the familiar rotation effect. The output radiation from the rotating element is then analyzed with the aid of prism 55 which is rotated 45 degrees with respect to prism 51. With no signal in the waveguide the polarization plane resulting from prism 51 remains unchanged and one-half the radiation will pass prism 55. When the signal reaches the requisite strength the plane of polarization will be rotated by the rotating element 52 through an arc corresponding with the allowed plane of prism 55 and all the radiation will be transmitted. By modulating the signal the detector 55 passes a modulated beam of varying light intensity. Alternatively, the light beam may be phase modulated by using a beam divider preceding the waveguide, modulating one portion of the beam and using the multiplier phototube to detect the beats with respect to the unmodulated beam.

Figure 5A:
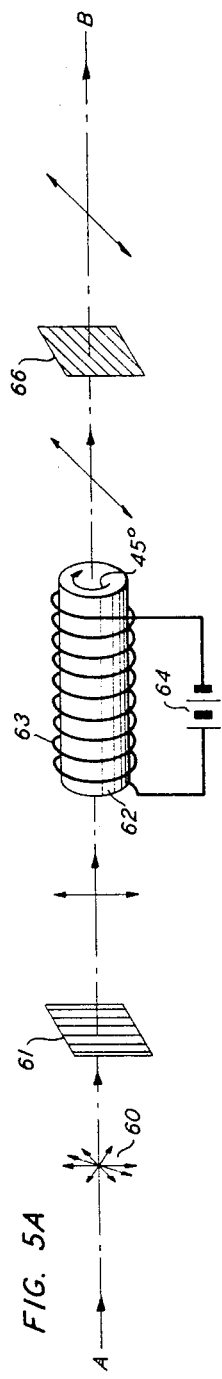
FIGS. 5A and 5B are schematic representations illustrating the operation of an optical isolator.
Figure 5B:
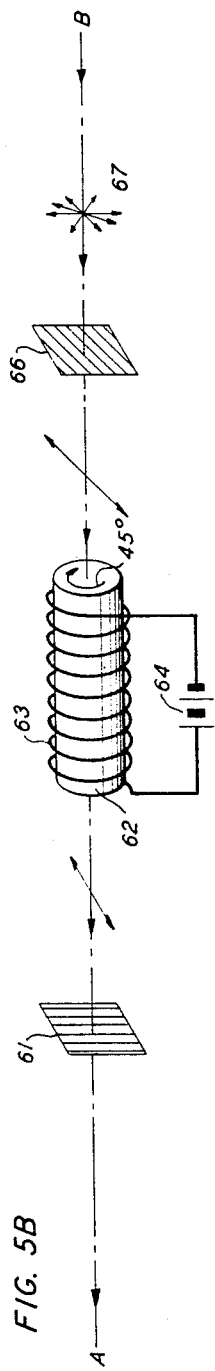

FIG. 5 illustrates an isolator constructed according to the same principles. FIG. 5A depicts the case in which light is transmitted from A to B while FIG. 5B represents the converse. Again the input radiation is represented by the symbol 60 which is plane polarized by prism 61 and rotated by the garnet rotating element 62. The rotating element has a solenoid or permanent magnet associated with it. The solenoid as shown includes coil 63 and power source 64. The field strength of the coil is adjusted by the power source in relation to the length of the rotating element 62 to achieve a rotation angle of 45 degrees as indicated. The analyzing prism 66 is adjusted to pass a rotated 45 degree beam. Referring now to FIG. 5B the unpolarized radiation 67 originates at B and is polarized at a 45 degree angle by polarizer 66. The rotator 62 rotates the plane of polarization another 45 degrees under the same operating conditions as prevailed in FIG. 5A. However, the radiation is now polarized 90 degrees with respect to the allowed transmission plane of prism 61 and no light passes from B to A.

Various other optical devices can be constructed according to the principles related here and those existing in the art. All such devices which basically utilize the teaching through which this invention has advanced the art are considered within the spirit and scope of this invention.

What is claimed is:

1. An optical device comprising, in combination, a light rotating medium consisting essentially of terbium aluminum garnet, a source of polarized light for directing polarized light through said medium, means for analyzing the light transmitted from the said medium, magnetic means for impressing a magnetic field on said medium, said field having a component in the direction of propagation of the light through the medium.

2. An optical device comprising, in combination, a light rotating medium consisting essentially of dysprosium aluminum garnet, a source of polarized light for directing polarized light through said medium, means for analyzing the light transmitted from the said medium, magnetic means for impressing a magnetic field on said medium, said field having a component in the direction of propagation of the light through the medium.

3. A modulator for light frequency radiation comprising a light rotating medium contained within a waveguide, said rotating medium consisting essentially of a material selected from the group consisting of terbium aluminum garnet and dysprosium aluminum garnet, a source of polarized light for directing polarized light through said medium, means for analyzing the light transmitted from the said medium, and signal means for introducing an electromagnetic signal into said waveguide thereby generating a varying magnetic field component in said rotating element.

4. An isolator for light frequency radiation comprising a light rotating medium consisting essentially of a material selected from the group consisting of terbium aluminum garnet and dysprosium aluminum garnet, a source of polarized light for directing polarized light through said medium, means for analyzing the light transmited from the said medium comprising a polarizer with its plane of polarization being oriented at an angle of 45 degrees with respect to the plane of polarization of the polarized light source, and magnetic means for impressing a magnetic field on said medium, said field having a component in the direction of propagation of the light through said medium.

No references cited.

DAVID H. RUBIN, *Primary Examiner.*
JEWELL H. PEDERSEN, *Examiner.*
P. R. MILLER, *Assistant Examiner.*